March 5, 1974   H. G. SOWMAN   3,795,524
ALUMINUM BORATE AND ALUMINUM BOROSILICATE ARTICLES
Filed March 1, 1971

INVENTOR.
HAROLD G. SOWMAN
BY Kinney, Alexander,
Sell, Steldt & DeLaHunt
ATTORNEYS United States Patent Office 3,795,524
Patented Mar. 5, 1974

3,795,524
ALUMINUM BORATE AND ALUMINUM
BOROSILICATE ARTICLES
Harold G. Sowman, Maplewood, Minn., assignor to Minnesota Mining and Manufacturing Company, St. Paul, Minn.
Filed Mar. 1, 1971, Ser. No. 119,726
Int. Cl. C04b 35/10
U.S. Cl. 106—65           29 Claims

ABSTRACT OF THE DISCLOSURE

Transparent refractory aggregates and shaped articles, such as fibers, films, flakes, and microspheres, of novel aluminum borate or aluminum borosilicate compositions free of crystalline alumina are made by shaping and dehydratively gelling, for example by extruding in air, viscous aqueous boric acid-stabilized aluminum acetate, with or without colloidal silica dispersed therein, and heating the resulting gelled body or article in a controlled manner to decompose and volatilize undesired constituents and convert the body to said refractory material or article, which is useful to form, for example, refractory fabrics, or as reinforcement for composites.

---

Figure 2:
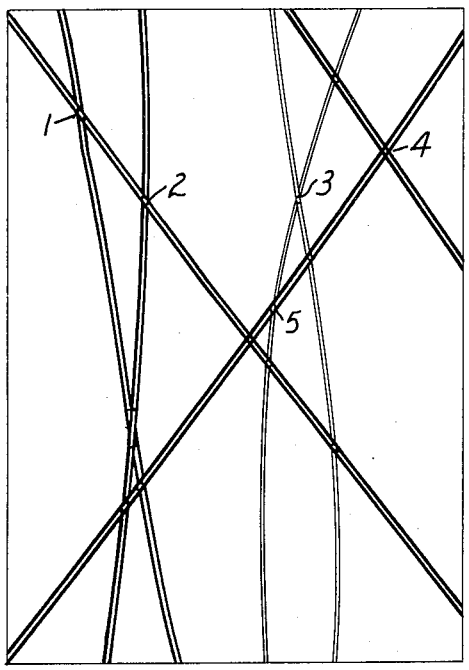

This invention relates to refractory material or articles made of or containing aluminum borate or aluminum borosilicate, such as fibers, microspheres, flakes, textiles, and composites. In another aspect, it relates to continuous, transparent, strong, flexible, round, smooth, and glossy refractory fibers of aluminum borate or aluminum borosilicate, which can be deeply internally colored, said fibers being useful as composite reinforcement or to make refractory articles such as fabrics. In another aspect, it relates to a process for the preparation of such refractory material. In still a further aspect, it relates to an aqueous mixture of colloidal silica, an aluminum compound, e.g., aluminum acetate, which can be converted to alumina, and a boron compound, e.g., boric acid, which can be converted to boria, which mixture can be extruded in air or otherwise shaped and dehydratively gelled and fired to form transparent, strong,, aluminum borosilicate refractory material.

Within the last decade, a number of patents have issued and other literature published describing various polycrystalline, microcrystalline, or non-vitreous fibers and other shaped articles of refractory metal oxides made by various non-melt processes, such as by drying films of solutions of oxygen-containing metal compounds, or drying organic polymeric bodies, such as cellulose or rayon impregnated with such a solution, or by extruding and drawing, or spinning viscous fluids of such metal compounds into fibers, followed by heating to remove water, organic material, and other volatile material to produce a refractory article. A recent review of the state of the art on polycrystalline inorganic fibers appears in Chapter 8 of "Modern Composite Materials," edited by Brautman and Krock, published by Addison-Wesley Pub Co., Reading, Mass. (1967). Literature describing polycrystalline fibers of aluminum borosilicate is found in a U.S. Department of Commerce report distributed by Clearinghouse of Federal Scientific and Technical Information as N69–13872, and in U.S. Pat. 3,503,765.

Non-vitreous inorganic or metal oxide fibers are still relatively in the early stage of development. In many technologies, there is a need for a relatively inexpensive refractory fiber product, and other relatively minute shaped refractory articles, with desirable physical properties, such as transparency, high strength and high modulus of elasticity, and the retention of such properties at high temperatures. Though some prior art refractory materials are useful, their utility is inherently limited due to such factors as the presence of constituents which undergo phase transformation (such as in the case of crystalline alumina) or give rise to other undesirable properties, such as opacity, porosity, graininess, and some refractory material cannot be made in desired shapes, such as continuous fibers.

Briefly, the refractory material of this invention, and shaped articles thereof, such as fibers, comprise aluminum borate or aluminum borosilicate. Unlike the refractory material disclosed in said report N69–13872 and U.S. Pat. 3,503,765, the refractory material of this invention is essentially free of any crystalline alumina, i.e. X-ray diffraction patterns of the refractory of this invention show no discernible free alumina crystallites. The refractory material of this invention are also transparent, have no discernible graininess under binocular (e.g. 48×) microscopic examination, and shaped articles thereof are additionally smooth-surfaced. Fibers of said refractory material can be made which are continuous in length, strong, glossy, have high moduli of elasticity, and they as well as other shaped articles can be deeply internally colored.

The refractory material of this invention can be made in an amorphous form and subjected to higher temperature to densify, strengthen, and convert them into a homogeneous mixture of amorphous and crystalline phases, or into an all crystalline form, with retention of desired shape, integrity, and transparency.

The above-described refractory fibers in their "green" or unfired form can be made by shaping and dehydrative or evaporative gelling, e.g., by extruding, drawing, spinning, or blowing, or combinations thereof, a viscous concentrate of an aqueous mixture comprising alumina and boria precursors, with or without silica precursor, such as colloidal silica, present in said mixture. Alternatively, said aqueous mixture can be gelled by evaporating water from a film thereof or by gelling droplets of such an aqueous mixture in a dehydrating alcohol to form spheres or bubbles, or by spray-drying the aqueous mixture in air to form beads, spheres, bubbles, or fine particles. The shaped green articles are then heated to remove further water and other volatiles, decompose organic material, and burn off carbon, and convert the article into a monolithic refractory comprising the above-described aluminum borate or aluminum borosilicate compositions.

The term "continuous fiber" as used in this application means a fiber (or monofilament) which has a length which is infinite for practical purposes as compared to its diameter. The continuous fibers of this invention, in green or refractory form, can be as long as 10–20 feet, or longer, fibers of shorter length than this arising only from occasional flaws due to minute inhomogenities, such as foreign particles or bubbles, stemming from their presence in the viscous concentrate precursor, or from inadvertent mechanical fracture. By bringing a plurality of the fibers together in the form of a continuous strand, tow, yarn, or other multifiber article, the occasional breakage or fracture of a continuous fiber does not affect the practical utility of the multifiber article containing a fiber whose length is relatively short. In any event, the fibers of this invention, even if broken or fractured for reasons given above, can be made in lengths which are significantly longer than the length of a staple fiber.

Figure 3:
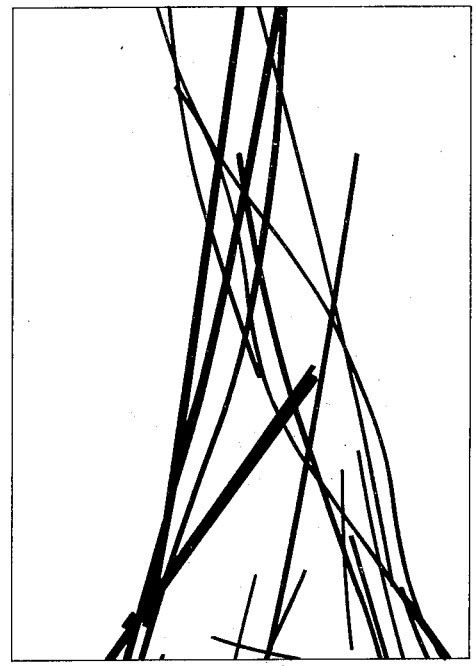
Figure 1:
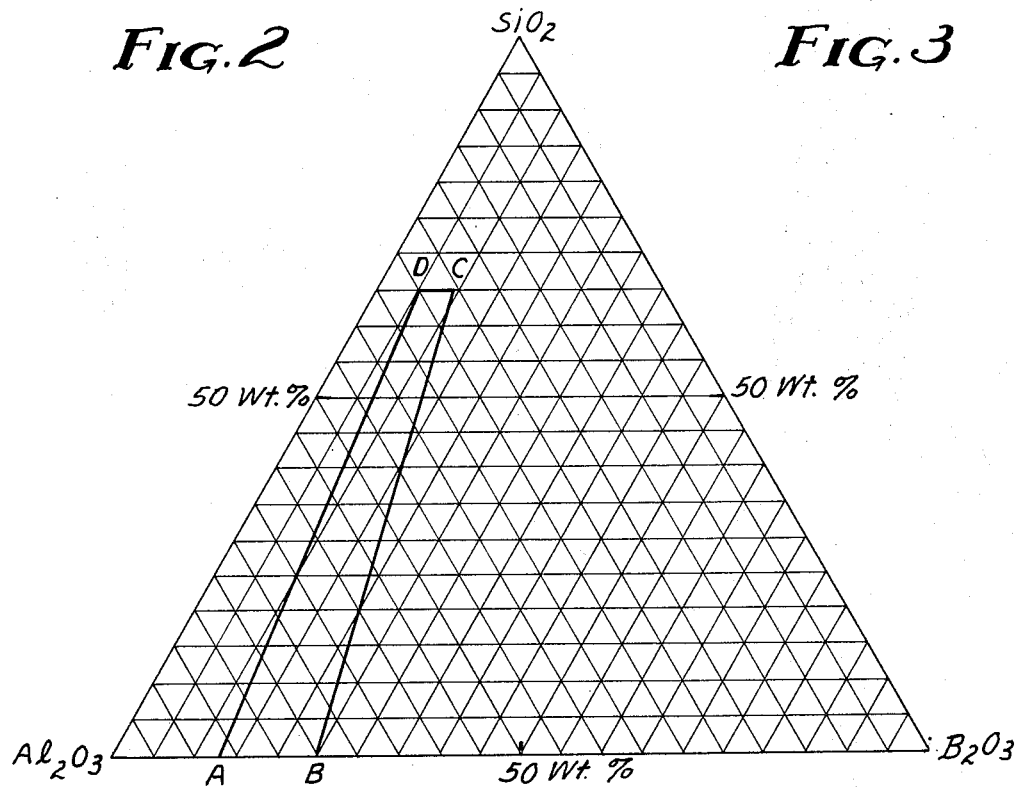

In the accompanying drawing, FIG. 1 represents a ternary compositional diagram of the alumina, boria, and silica system with the aluminum borate and aluminum boro-silicate compositions of this invention designated thereon; and FIGS. 2 and 3 are pen-and-ink sketches drawn to the same scale of photomicrographs (75X) taken in all cases with a light or optical microscope using transmitted and oblique light, FIG. 2 representing transparent aluminum borate, $3Al_2O_3:1B_2O_3$, fibers of this invention, having a diameter of about 15 microns, obtained by firing at 900° C., and FIG. 3 representing opaque aluminum borate fibers, $3Al_2O_3:1B_2O_3$, having a diameter of about 10–15 microns, obtained by firing at 1400° C.

Referring to FIG. 1, the preferred refractory compositions of this invention fall within the area or along the boundary defined by A, B, C, and D. The aluminum borate compositions based on only alumina and boria (i.e., no silica) fall along the boundary line A–B, the metal oxides along this line varying from $9Al_2O_3:2B_2O_3$ (point A) to $3Al_2O_3:1.5B_2O_3$ (point B). The aluminum borosilicate compositions based on alumina, boria, and silica fall within said area A, B, C, and D or along the boundary lines B–C, C–D, and D–A, the silica component being up to about 65 weight percent, the metal oxides along boundary line C–D varying from $$3Al_2O_3:1.5B_2O_3:12.7SiO_2$$

(point C) to $9Al_2O_3:2B_2O_3:32.7SiO_2$ (point D).

The composition from which the refractory of this invention can be formed can be an aqueous solution of water-soluble aluminum and boron compounds or can be a two-phase system comprising an aqueous mixture of a colloidal dispersion of silica and water-soluble or dispersible aluminum compounds and boron compounds, said compounds being those compounds which can be calcined to the respective metal oxides, alumina and boria. Generally, the aluminum and boron compounds are present in the solution or two-phase system in amounts sufficient to provide an equivalent $Al_2O_3:B_2O_3$ mol ratios in the range of 9:2 to 3:1.5, preferably about 9:2 to 3:1⅓, and typically 3:1. Compositions on or near boundary line B–C of FIG. 1 are more prone to immiscibility or precipitation and the refractory articles made therefrom are likely to have defects or fracture. The silica component of said two-phase system can vary and be as much as 65 weight percent based on the total weight of three metal oxides present, the silica component preferably being present in the amount of about 20 to 50 weight percent. Generally, the green articles made from two-phase systems containing high amounts, e.g. above 20 weight percent, of the silica component can be fired more rapidly, and thus more economically, to obtain the desired physical properties including physical strength, integrity, and transparency; such articles also will withstand higher temperatures in use. Compositions on boundary line A–B of FIG. 1, or near such line, result in refractory products which are relatively more porous and more highly crystallized, and thus more fragile.

The aqueous solution used to prepare refractories comprising aluminum borate (i.e., those falling on line A–B of FIG. 1) can be prepared by mixing water-soluble or dispersible aluminum and boron compounds together in water. Suitable aluminum compounds which can be used representatively include aluminum chloride hexahydrate, $AlCl_3 \cdot 6H_2O$, aluminum formoacetate,

$$Al(OH)(OOCH)(OOCH_3)$$

and aluminum nitrate, $Al(NO_3)_3 \cdot 9H_2O$. Suitable boron compounds which can be used are boric acid and boria. Especially useful raw material which can be used to prepare an aqueous solution is basic aluminum acetate, $$Al(OH)_2(OOCCH_3) \cdot \tfrac{1}{3}H_3BO_3$$

sold under the trademark "Niaproof," which is a boric acid-stabilized aluminum acetate powder containing an equivalent mol ratio of $Al_2O_3:B_2O_3$ of 3:1. The pH of an aqueous solution of this powder will be inherently on the acid side, e.g. less than 5, and concentrations of about 30 to 40 weight percent generally will be useful. Such an aqueous basic aluminum acetate solution is preferred in the preparation of refractory fibers because such fibers have better integrity and appearance than those made, for example, using aqueous boric acid-aluminum formoacetate. Boric acid-aluminum chloride solutions, though useful, generally result in fibers with more flaws and less integrity.

The two-phase system used to prepare the aluminum borosilicate refractories of this invention can be prepared by admixing an aqueous colloidal dispersion of silica with the above-described aqueous solution of the aluminum and boron compounds, said basic aluminum acetate solution again being preferred. The two-phase dispersion can be prepared by adding the dispersion of silica to the aqueous acetate-boria solution with mixing in order to obtain a uniform dispersion without formation of a gel, floc, or precipitate. The pH of the resulting dispersion will be inherently on the acid side, e.g., below 6. The pH is preferably 3–5. If desired, a heat fugitive acid, such as hydrochloric, nitric, or acetic acid, can be added to the colloidal silica dispersion to acidify the same prior to use and prevent premature gelling. It is also within the scope of this invention to incorporate heat fugitive organic agents in the two phase system dispersion to improve shelf-life of the subsequently concentrated system or to increase viscosity to improve the fiberizing nature of the latter. Such organic agents representatively include polyvinylpyrrolidone, polyvinyl alcohol, dimethylformamide, and glucose (e.g. corn syrup), these additives being oxidized and removed during the firing of the green articles produced from such systems.

The silica aquasol or aqueous dispersion of colloidal silica can be used with $SiO_2$ concentrations of 1 to 50 weight percent, preferably 15 to 35 weight percent, the latter concentrated dispersions being preferred because of their commercial availability and because, if used, the amount of water that has to be removed from the resulting mixture in order to viscosify it will be less than if a more dilute dispersion is used. However, the colloidal silica can be used in the form of an organosol, the silica being colloidally dispersed in such water-miscible, polar organic solvents as normal or isopropyl alcohol, ethylene glycol, dimethylformamide, and various Cellosolve glycol ethers as methyl Cellosolve (2-methoxyethanol). The size of the colloidal silica particles in the aquasols or organosols can vary, e.g. from 1 to 100 millimicrons, but generally will be on the order of 5 to 30 millimicrons, preferably about 10 to 16 millimicrons.

Preferred aqueous colloidal dispersions or sols which can be used in this invention are those sold under the trademarks "Ludox," "Nalco," and "Syton," such as Nalco 1030, Nalco 1034A, Nalco D–2139, and Syton 200. Table I below sets forth the properties of various technical grades of aqueous colloidal dispersions of silica which can be used. These raw materials may have associated impurities or stabilizers, e.g. sodium compounds, though the total amount of such are generally less than 0.5 weight percent. In some cases it may be desirable to filter the silica dispersion to remove extraneous solids, bacterial growth, and other materials.

TABLE I

| Colloidal silica product | Particle size, mμ | $SiO_2$, wt. percent | pH (at 25° C.) |
|---|---|---|---|
| Ludox HS 40 | 13–14 | 40.1 | 9.54 |
| Ludox HS | 13–14 | 30.1 | 9.8 |
| Ludox LS | 15–16 | 30.1 | 8.3 |
| Ludox SM-15 | 7–9 | 15.0 | 8.5 |
| Ludox SM-30 | 7–8 | 29–31 | 9–10 |
| Ludox TM | 22–25 | 49.0 | 8.5 |
| Ludox AS | 13–14 | 30.1 | 9.4 |
| Ludox AM | 13–14 | 30.1 | 8.8 |
| Nalco 1030 | 11–16 | 30.0 | 10.2 |
| Nalco 1034A | 16–22 | 34.5 | 3.1 |
| Nalco D–2139 | 5 | 25.0 | 10 |
| Syton 200 | 16 | 30.1 | 9.1 |

The aqueous solutions or dispersions which are used to form the refractories of this invention can also contain various other oxygen-containing, water-soluble metal compounds which will impart a deep or intense internal color to the final refractory upon being converted or oxidized to the corresponding metal oxide without sacrifice of clarity. For example, ferric nitrate can be added to impart a red to orange to gold color, chromium diformate, trioxide, or chloride to impart a green color, cobalt acetate or chloride to impart a blue or lavender color, calcium formate to impart a yellow color, nickel acetate to impart a light yellow or gold color, and copper chloride to impart a light green. The ferric oxide-containing refractory can be reduced in a hydrogen atmosphere, the resulting reduced iron oxide or iron imparting a black color to the refractory and making it attractive to a magnet but not electrically conductive. (Such refractory can be used to make composite ceramics useful in electrical equipment, such as coils, plates, rotors, magnetic circuitry, etc.) The amount of such coloring additive will vary depending upon the tone of the color or hue desired, but generally will be an amount in the range of 0.5 to 10 to 25 weight percent or higher, preferably 1 to 10 weight percent expressed as the metal oxide, e.g. $Fe_2O_3$, based on the combined total weight of the alumina, boria, silica, and metal oxide additive in the refractory article. High amounts of some coloring additives may result in refractory articles with less transparency and lower tensile strength, but even such lower tensile strength will be appreciably higher, e.g. 100,000 p.s.i. or higher. Metal oxide precursors can also be added to adjust refractive index.

The aqueous solution or dispersion, as prepared, will be a relatively dilute liquid, generally containing about 10 to 40 weight percent equivalent solids. For the preparation of shaped articles such fibers, it is necessary to concentrate or viscosify this dilute liquid in order to convert it to a viscous or syrupy fluid concentrate which will readily gel when the concentrate is formed into a shaped article and dehydrated, for example when the concentrate is extruded and drawn in air. The concentration step can be carried out by techniques known in the art, which generally involve evaporation to remove large amounts of water and volatile gases. Such evaporation can be carried out at ambient temperature and pressures, but preferably is carried out or finished under vacuum, such as that generated by a water aspirator. Such evaporation can be carried out in a flask wholly or partly submersed in a water bath having a temperature, for example of 30 to 50° C.; the liquid undergoing vacuum concentration in the flask will, of course, sometimes be cooler than this temperature, e.g. 0 to 10° C. Suitable apparatus for concentrating the liquid is a Rotavapor flask partly submersed in a water bath and connected to a water aspirator. Sufficient concentration will be obtained when the solids content is generally in the range of 30 to 55 weight percent, and viscosities (Brookfield at ambient room temperature) in the range of 15,000 to 1,000,000 cps., preferably 45,000 to 500,000 cps., depending on the type of dehydrative gelling technique and apparatus used and the desired shape of gelled article. Too high a viscosity may be prohibitive for the particular equipment used to extrude the concentrate. It, of course, is not concentrated to the extent where the solubility of the precursor metal oxide compounds is exceeded to the point where macrocrystals are formed. The viscous concentrates are relatively stable but low temperature storage may be preferred if the concentrate is not to be used shortly after preparation, e.g. within 24 hrs. Prior to dehydrative gelling, the concentrate can be centrifuged to remove air bubbles and/or filtered to remove extraneous solid material, bacterial growth, etc. The particular solids content or viscosity used for dehydrative gelling will be dependent on the particular apparatus and conditions used to form shaped articles from the viscous concentrate. For example, when the viscous concentrate is extruded under pressure, e.g. 50 to 1000 p.s.i., using a conventional stainless steel spinnerette, with a plurality of orifices (e.g. 15 to 100 or more 1 to 10-mil orifices), such as used in the rayon industry, the viscosity of the concentrate should be such that fibers are formed in a continuous manner without breaking of the extruded fiber as it is formed.

The viscous concentrate can be extruded through orifices and allowed to fall in air by the force of gravity or drawn mechanically in air by means of rolls or a drum or winding device rotating at a speed faster than the rate of extrusion, or the concentrate can be extruded through orifices from a stationary or rotating head and blown by parallel, oblique or tangential streams of air, such as in the making of cotton candy, the blown fibers being collected on a screen or the like in the form of a mat. Any of these forces exerted on the extruded fibers, e.g. gravity, drawing, or air streams, cause attenuation or stretching of the fibers, reducing their cross-sectional area by about 50 to 90 percent and increasing their length by about 100 to 1000 percent and serve to hasten or aid the drying of the fibers. It is also within the scope of this invention to pour or spread the concentrate on a non-adhering, flat substrate and allow the resulting film, e.g. 2 to 10 mils thick, to dry in ambient air. Other techniques for dehydrative gelling will be apparent to those skilled in the art.

The dehydrative gelling of the article is carried out in ambient air or heated air can be used if desirable or necessary to obtain fast drying. The relative humidity of such air should not be too high, since large amounts of moisture will cause the gelled or shaped green articles to stick together. Generally, relative humidity in the range of 20 to 60 percent can be used, at temperatures of 15 to 30° C. If the humidity is high and must be tolerated, compensations can be made by using a concentrate with a higher viscosity, extruding at a lower rate, using a lower drawing rate, using a smaller extrusion orifice, exposing the green articles to heated air as they are formed, and/or increasing the distances between the extrusion orifice and the point where the individual extruded articles come into contact. The green fibers can be brought into contact to form a strand of multi-fibers and the strand can be sized to hold the fibers together without sticking. Where a size is used, the strand (or extruded fibers) can be mechanically drawn over a size applicator, like that used in the textile industry, and a conventional heat fugitive size or lubricant, such as an oil, applied. Heat lamps or the like can be used to volatilize the size to as to avoid combustion of the size when the green articles are fired, such combustion tending to cause overheating of the articles (i.e., temperature and rate of temperature rise caused by combustion may be higher than desired). The size may also require longer firing to completely remove it from the fired article. On the other hand, if the relative humidity is too low, e.g. 10 to 15 percent, or lower, the green articles may dry too fast and they will tend to break or fracture during spinning or handling before they can be fired. Low humidity conditions may be compensated for by extruding at a faster rate, drawing the extruded article at a faster rate, using larger extrusion orifices, decreasing the distance between the orifices and the point where the articles come into contact, and/or using concentrates with lower equivalent solids content or lower viscosities. Air currents should be minimized because they may cause the individual extruded articles to come into contact before they are sufficiently dry or cause fiber breakage. In any event, the extruded or otherwise gelled articles should be made or handled under conditions which will prevent or minimize their contact with one another before they are sufficiently dry (though in some cases, such as in the preparation of flakes or aggregates, sticking of the green articles together will be of no moment where their utility or application, e.g. as ground pigments, do not dictate separated articles).

Further detail on the shaping of articles from the viscous concentrate will be omitted here in the interest of brevity since such shaping procedures are well known, reference being made to said "Modern Composite Materials" text which illustrates and describes apparatus which can be used in this invention to form fibers from viscous concentrates.

The fibers in the green or unfired gel form, as well as other shaped gelled articles fabricated from the viscous concentrate, generally comprise about 40 to 80 weight percent equivalent solids and are dry in the sense that they do not adhere or stick to one another or other substrates and feel dry to the touch, but they still do contain substantial amounts of water and organic material, e.g. 20 to 60 weight percent, and it is necessary to heat or fire the articles in order to remove further water and organic material and convert the articles into refractory articles. The terms "dehydrative gelling" or "evaporative gelling," as used herein, therefore does not mean that all the water in the shaped article is removed and does not mean that macro-crystals are formed. Thus, in a sense, this step can be called partial dehydrative gelling. It may be noted at this point that the shaped articles in their green form are transparent and clear under an optical microscope; and unless coloring additives are included in the viscous concentrate, they appear to look like colorless glass fiber. These green fibers, as well as other solidified gel articles (such as microspheres and flakes) of this invention in their green form, are amorphous.

In order to remove the balance of water and organic material from the green or solidified gel articles and convert them to refractory articles, they are heated in an electric furnace, kiln, or the like in air, oxygen, or other oxidizing atmosphere, at moderately high temperature of about 600° C., or as high as 1000° C., or higher, if desired. Heating can be accomplished in a number of ways, for example by heating in a single step at a desired temperature or by heating in a series of steps at progressively higher temperatures, with or without cooling or storage between steps. The green fibers can be heated in the form of individual fibers or collected in an irregular or random order and heated, or heated in the form of strands (a plurality of untwisted, parallel-aligned fibers), or heated in the form of hanks (a bunch of fibers or strands), or they can be chopped in the form of staples and fired in that manner. Also, the green strands or fibers can be twisted in the form of yarn and heated as such or can be woven to form a cloth and heated in the latter form. In firing the green articles, care should be exercised to avoid ignition of combustible material in or evolved from the articles, for example by staring out at a low temperature, e.g. room temperature, and elevating the temperature at a slow rate, since such ignition may cause the formation of opaque, fragile articles. If the green articles are not to be fired completely in one operation or are not to be fired immediately or soon after their formation, it may be desirable or necessary to store the articles in a relatively dry or protective atmosphere to prevent them from picking up moisture or contaminants and deteriorating or sticking together.

As indicated by thermogravimetric and differential thermal analyses, the heating step volatilizes the balance of the water, decomposes and volatilizes organic material, and burns off carbon, the resultant article being an essentially carbon-free, monolithic, homogeneous refractory. This heating step also causes some shrinking of the article, the amount of linear shrinkage being generally 25 percent or more, and the volume shrinkage being generally 50 percent or more. However, the shape of the article during firing remains intact; for example, fibers when so fired are still of essentially continuous length. Rather than firing the green articles in air to remove water and organic material, they can be heated in an autoclave in an inert atmosphere (e.g., 100 to 2000 p.s.i. helium, argon, or nitrogen), for example at 300 to 500° C., in order to increase their porosity. Then, they can be refired in air to remove carbon, e.g. at 500 to 900° C., and convert them into a refractory essentially free of carbon.

The refractory material resulting from firing the green articles at about 600° C. are amorphous (i.e., no crystalline material is discernible by X-ray diffraction analysis). Such amorphous articles are transparent, clear, glossy, smooth, porous, and colorless (unless colorants are deliberately incorporated in the precursor liquid concentrate). They have useful strength and can be handled without breakage. If the amorphous refractory articles are fabricated as fibers, they are continuous, round, smooth, and flexible. All of these properties (except porosity) of the amorphous articles can be retained or enchanced upon firing to higher temperatures to form crystalline refractory articles, as explained hereinafter. The amorphous fibers can be woven to form fabric. Because of the porosity of the amorphous refractory articles, solutions of soluble metal compounds can be absorbed therein and dried and fired to convert the compounds to metal or metal oxide deposits which enhance or change the color, index of refraction, modulus of elasticity, and magnetic or electrical properties of the articles; by using this technique, the fired article can serve as a support for catalytic metals or metal oxides. The aforementioned amorphous materials fall on the boundary line A–B of FIG. 1 if they are aluminum borate based refractories or within the area A, B, C, D, or on the boundary lines B–C, C–D, and D–A, if they are aluminum borosilicate-based refractories.

Physical properties of the amorphous aluminum borate refractories, such as density, tensile strength, and modulus of elasticity can be increased by further firing at higher temperatures, e.g., up to 1000° C., without loss of transparency, clarity, gloss, or surface integrity. Such increase in density makes the articles more stable and less prone to contamination. If the amorphous aluminum borate refractory articles are heated at these high temperatures, crystalline $9Al_2O_3 \cdot 2B_2O_3$ is formed and discernible by X-ray diffraction analysis, the relative intensities of the 5.4 and 3.4 diffraction lines being 100 and 40, respectively, and the relative intensities of the 4.35 diffraction line being variable, depending on the firing temperature and soak time at that temperature. At 1000° C., these aluminum borate refractories become highly crystalline. Whenever said crystalline $9Al_2O_3 \cdot 2B_2O_3$ is formed, it is the only crystalline species discernible by X-ray analysis in the aluminum borate refractories of this invention and no free alumina is present or discernible. The aluminum borate refractories falling near the center of the boundary line A–B, containing the crystalline $9Al_2O_3 \cdot 2B_2O_3$ species, can be obtained more rapidly at firing temperatures without breakage and with more complete removal of carbon than those at or near points A and B. Thus, aluminum borate refractories having the over-all composition of about $3Al_2O_3:1B_2O_3$ are preferred. If aluminum borate refractories are heated or fired at about 1200° C. or above, they lose their transparency and become opaque, as shown by comparison of FIGS. 2 and 3. This transformation is coincident with fragility and loss of strength, fibers readily breaking. At 1400° C., X-ray analysis shows the formation of alpha alumina. Note in FIG. 2, where one fiber intersects and overlays that of another, the diffracted outline of the fiber below can be sharply seen through the top fiber, as indicated, for example, by reference numbers 1–5. In FIG. 3, the opacity of the fibers masks such outline.

In describing refractory products of this invention as "transparent," this term means that the particular article in question, when viewed under a microscope has the property of transmitting rays of light, so that bodies beneath the article, such as bodies of the same nature as the transparent article, can be clearly seen through the transparent article, the outline, periphery or edges of bodies beneath being sharply discernible. "Opaque" articles, on the other hand, are those which are impervious to light and bodies beneath are obscured by the opaque article and cannot be seen therethrough. The "translucent" articles are those which fall between transparent and opaque, and though translucent articles have the property of transmitting light to some degree, and therefore are somewhat or partly transparent, bodies beneath can be seen in a diffuse manner rather than in a clearly distinguishable or sharp manner. Sometimes, because of vagaries in firing, an article or product may be a mixture of these various types of products, though generally one will be present in a predominant amount, indicative of the true nature of the mixture, the other products present in minor amounts having their particular appearance due to incomplete firing at the desired temperature or due to overheating because of hot spots in the furnace.

Generally, properties of the amorphous aluminum borosilicate refractories, such as density, tensile strength and modulus of elasticity, can also be increased by firing at higher temperatures, e.g. up to 1000-1200° C., without loss of transparency, clarity, gloss, or surface integrity. When amorphous aluminum borosilicate refractories are heated above 600° C., differential thermal analysis of such material, e.g., $3Al_2O_3:1B_2O_3:3SiO_2$, reveals a distinct exotherm at about 850-870° C., and X-ray diffraction analysis reveals the coincident formaiton of a novel crystalline species at this temperature. The distinguishing portion of the X-ray diffraction pattern for this novel crystalline species is set forth in Table II below, together with corresponding portions of the patterns of mullite ($3Al_2O_3 \cdot 2SiO_2$) and $9Al_2O_3 \cdot 2B_2O_3$ for comparison.

TABLE II

| Novel aluminum borosilicate | | Mullite | | $9Al_2O_3:2B_2O_3$ | |
|---|---|---|---|---|---|
| $d_{hkl}$ | $I_{rel}$ | $d_{hkl}$ | $I_{rel}$ | $d_{hkl}$ | $I_{rel}$ |
| 5.4 | 60-100 | 5.4 | 40 | 5.4 | 100 |
| 4.35 | 0-50 | 4.35 | 0 | 4.35 | 60 |
| 3.4 | 40-80 | 3.4 | 100 | 3.4 | 40 |

Note that the relative intensities of the 5.4 and 3.4 diffraction lines of the novel aluminum borosilicates are respectively significantly higher and lower as compared to the corresponding diffraction lines of mullite; thus, said aluminum borosilicates can be characterized as having a "reverse mullite" pattern. These data of Table II also indicate that the aluminum borosilicate crystalline species may be a solid solution of mullite and crystalline aluminum borate, $9Al_2O_3 \cdot 2B_2O_3$. No other crystalline species, such as free alumina, is formed or discernible by X-ray analysis in the novel aluminum borosilicate refractories of this invention.

The aluminum borosilicate refractories of this invention, containing said novel crystalline species, are transparent, clear, glossy, smooth, and colorless (unless colorants are incorporated into the precursor liquid concentrate). In the form of continuous fibers, they have high tensile strength, e.g. generally 80,000 to 350,000 p.s.i. and as high as 600,000 p.s.i., and high modulus of elasticity, e.g. 7,000,000 to 35,000,000 p.s.i. Generally, as the $SiO_2$ component of the aluminum borosilicate compositions increase, while the $Al_2O_3$ and $B_2O_3$ remain constant, the modulus of elasticity, density, and index of refraction decrease. If the aluminum borosilicate articles are heated above about 1200° C., their mechanical properties generally begin to deteriorate and they are more susceptible to breakage. Generally, the aluminum borosilicate refractories preferred for all-around purposes, i.e. for a balance of physical properties and ease of fabrication, are those having a high silica content, e.g. 20-50 weight percent, a mol ratio of $Al_2O_3$ to $B_2O_3$ of about 9:2 to 9:4, and are obtained at firing temperatures of about 900 to 1000° C.

A preferred method and apparatus for forming the refractory fibers of this invention is that disclosed and claimed in co-pending application Ser. No. 119,748 filed concurrently herewith, now U.S. Pat. 3,760,049, the disclosure of which is incorporated herein in entirety. Briefly, in said copending application, a viscous solution or dispersion of soluble or dispersed metal compounds is extruded from a spinnerette, the resulting continuous green fibers are drawn in air (preferably as a strand) and allowed to continuously accumulate or collect in a free-form, relaxed manner on a moving belt which is continuously passed through a furnace to remove volatiles and burn off organic material, and the resulting continuous refractory fibers are continuously pulled in a straight or linear form through a furnace at higher temperature to densify, strengthen, straighten and/or modify the microstructure of the fibers or develop desired crystalline species therein.

The refractory spherical particles or microspheres, either solid or hollow, can be prepared from the same precursor liquids used to make fibers, with or without colloidal dispersion of silica incorporated in the aqueous solution of aluminum and boron compounds, by using the shaping and dehydrative gelling techniques and equipment of the prior art (e.g., U.S. Pat. Nos. 3,329,745 to La Grange, 3,331,783 to Braun et al., 3,331,785 to Fitch et al., 3,340,567 and 3,380,894 to Flack et al.). (This type of dehydrative gelling can be considered in a sense as a solvent-extraction.) For this purpose, it is not necessary to concentrate the liquid precursor and it can have a variable equivalent solids content, for example, of 15 to 40 weight percent, and a viscosity, for example, of 20 to 40 cps. Rather, the liquid precursor can be dispersed in the form of small droplets in an organic dehydrating liquid having low water solubility (e.g., 1 to 30 volume percent), such as $C_4$ to $C_{10}$ alkanols, e.g. butanol, hexanol, ethylbutanol, and ethylhexanol. Some of these alcohols can be nearly saturated with water, such as butanol, or partly mixed with water, e.g. hexanol mixed with 3 to 6 weight percent water, or used in anhydrous form, e.g., 2-ethyl-1-hexanol. These partly water-immiscible alcohols are preferred dehydrating liquids to be used in this invention, and they have sufficiently small solubility for water that water is extracted from the dispersed droplets at a rate small enough to allow the droplets to dehydratively gel into microspheres of uniform surface and internal structure. The amount of dehydrating liquid used should be sufficient to prevent the droplets or spherical particles formed therein from sticking together. In the case of 2-ethyl-1-hexanol, the amount of water in the dehydrating liquid is maintained at less than 2 volume percent. Alternatively, an oil, such as mineral oil, can be used as the dehydrating medium, such oil being heated, e.g. to 60-90° C., to dehydrate the droplets dispersed in the heated oil.

The addition of the dispersion to the dehydrating liquid can be made by injecting or jetting a stream of the dispersion into the body of the dehydrating liquid either above or below the surface thereof, for example with a hypodermic needle. The dehydrating liquid is preferably stirred or swirled during the addition of the dispersion thereto. After addition of all of the dispersion to the dehydrating liquid, the mixture can be stirred further, for example for 20 to 30 minutes, until the resultant spherical particles of the dispersion are sufficiently dehydrated and firm. The spherical particles can be separated from the dehydrating liquid, for example, by filtering or by centrifuging, and allowed to dry in air (like the green fibers described above) at ambient room temperatures or higher, for example 60 to 80° C., to a solids content of 40 to 80 weight percent. The particles can then be fired to convert them into hard refractory particles in the same manner that the above-described refractory fibers are formed, e.g., fired in air at 600 to 900° C. or higher, i.e. 900° C. to 1200° C. The particles in the green form or their fired form will generally be water clear, transparent and spherical under an optical microscope, and they can also be internally colored in the same way as described for the colored fibers by adding various water-soluble metal salts to the initial precursor liquid, with or without the dispersion of silica incorporated therein. Generally, the green and the fired spherical particles will have diameters in the range of 1 to 200 microns, usually 20 to 100 microns, depending upon the degree of agitation used in forming them, more vigorous agitation giving smaller spheres. The spheres will generally be solid, and hallow spheres in a minor amount may also be concurrently produced. The microspheres can be air- or screen-classified to obtain fractions with desired diameters, and can be subjected to flotation techniques to separate solid microspheres. The crystallographic identity of the microspheres will be the same as that described above for fibers fired under the same conditions.

Another technique for making green spherical particles is to spray-dry the precursor liquid in a dilute or concentrated, non-viscous form. Atomizing of the precursor liquid can be carried out, for example, with pressure nozzles at 15 to 20 atmospheres, the droplets or spheres as made descending in a countercurrent of dry air at ambient room temperature or in a flowing stream of warm air.

Refractory products in the form of flakes or films can also be prepared from the precursor liquid, with or without the dispersion of colloidal silica incorporated therein. Here again, it is not necessary to concentrate the precursor liquid. Rather, the precursor liquid can be poured, knife-coated, spread, or the like in the form of a sheet or film on a suitable non-adhering, smooth inert substrate, such as a film of polyester. "Teflon" polytetrafluoroethylene, glass, etc. If desired, a suitable wetting agent can be added to the precursor liquid to increase the wetting of the substrate by the applied precursor liquid, such increased wetting enhancing the formation or uniformity of film or flakes. The applied film, e.g. 1 to 50 mils, normally 3 to 5 mils, thick, is then dried in air at ambient room temperature or higher, like that described above for the green fibers and microspheres. In the course of this drying, the film, depending upon its thickness and the degree to which it wets the substrate, may tend to crack and form flakes. After the film has sufficiently dried in air, it can be removed from the substrate, for example by lifting or scraping it off. The removed film can be comminuted to form irregularly shaped particles, flakes, or aggregates, e.g. $\frac{1}{16}''$ to $1''$ large, 1 to 25 microns thick, or ground to form powders of small size. In any event, the dried film, flake, or powder is then heated to convert it into refractory material, using firing temperatures like those discussed above in the firing of fibers. The fired refractory generally will be clear and transparent under an optical microscope. Here again, water-soluble salts of metal compounds can be added to the precursor liquid to form internally colored refractory material. This refractory material likewise will have the same crystallographic identity as the fibers formed from the same composition and fired under the same conditions.

The refractory material or product of this invention is generally useful where high temperature stability or refractoriness is desired or required, for example up to about 1000 to 1400° C., depending upon the particular refractory used and the length of service at such high temperatures. Above such temperatures, the refractory products of this invention generally will begin to lose strength and flexibility, coincident with the formation and crystal growth of mullite together with the volatilization of boric oxide or excessive crystal growth of $9Al_2O_3:2B_2O_3$. However, where such losses in properties are not important for the particular application of these refractory products, they can be employed in such applications since they will retain their solid state to temperatures above 1400° C. The refractory products of this invention can be employed alone (or per se) in various applications in the form in which they are obtained as fired, or their physical form can be modified, e.g., comminuted or pulverized to form a powder, or in their form as prepared or as modified they can be mixed or coated with or bonded to other materials, e.g. composite matrix materials.

Articles of this invention are preferably those which are transparent though for some particular applications, for example where the product is used as a reinforcement for composites, transparency will not be important. The transparent quality of a refractory product of this invention is coincident with other desirable properties, such as strength and flexibility, and thus transparency can be considered in a sense as a gross measure of the quality of the refractory product. In some applications of the refractory products of this invention, e.g. where a fiber or bundle of fibers are used in fiber optics or where microspheres are used in reflective sign surfaces, transparency will be of special importance.

The refractory fibers of this invention are particularly useful in fabricating woven, felted, knitted, and other types of textiles such as braids. Such textiles generally will have the same properties, such as high strength, flexibility, refractoriness, and chemical resistance, as the fibers from which they are made. The internally colored refractory fibers will find particularly useful application in decorative fabrics, such as used in clothing, upholstery, wall covering, etc. Fibers or yarns of this invention of different colors and/or composition can be used together in making fabrics with decorative designs. Fibers or yarns of this invention can be plied or interwoven with fibers of other materials, such as metal fibers, silica fibers, carbon, graphite, Teflon polytetrafluoroethylene or fiberglass, if desired. Woven cloths made from the refractory fibers can be firmly bonded as wall covering to various substrates. For example, such cloths can be bonded with molten glass, or refractory cements such as zircon, aluminum oxide, phosphates, and silicates, to aluminum or other metal substrates and used as the interior walls of airplanes. The woven cloths (or mats) can also be used as layups in plastic, metal, or ceramic laminates. The fibers can be also bonded with such cements as well as colloidal silica, to form flexible ceramic papers or mats useful as thermal insulation or preforms for reinforced resin composites.

The refractory fibers of this invention can be used in the form of fabrics, mats and batting as lightweight acoustical or thermal insulation for high temperature equipment, such as resistance and induction furnaces, and for purpose of heat shielding or reflecting, such as heating mantles and thermal curtains.

In their porous form, the refractory fibers are useful in filtering or adsorption applications, for example a filter to remove solids from hot gases, as a chromatographic column packing to selectively separate or resolve liquids or gases, or as catalysts or catalyst supports.

Another particularly useful application for the refractory products of this invention is that of reinforcement for structural plastic, elastomeric, metallic, or ceramic composites, especially those composites used in high temperature environments or even hyperthermal environments found in the aerospace industry, and in ablative environments. As composite reinforcement, the refractory products of this invention are preferably used in the form of fibers (either in continuous or staple form), though other particulate forms, such as microspheres, aggregates, powders, and flakes, can be used for such purposes. The matrix materials which can be so reinforced include any of those heretofore used in making such composites, such as those disclosed in the above-cited "Modern Composite Materials" text and "Handbook of Reinforced Plastics," by Oleesky and Mohr, Reinhold Pub. Co., New York (1964). The plastics may be either of the thermosetting or thermoplastic types. Representative plastics which can be used include epoxy resins, polyester resins, acetal resins, acrylics, especially methyl methacrylate polymers, amino resins, especially urea-formaldehyde, and melamine-formaldehyde, alkyds, cellulosics, especially ethyl cellulose, cellulose acetate, and cellulose propionate, fluorocarbons, furanes, polyurethanes, phenolics, polyamides, polycarbonates, vinyl aromatics such as styrene, polyolefins, especially polyethylene, and the like. The refractory products of this invention can be made with a wide useful range of indices of refraction, e.g. about 1.50 to 1.63, such indices being complementary and compatible with the indices of said plastics when said refractory products are used as reinforcement therefor. For example, refractory spheres of this invention can be used as reinforcement for plastics used in dental filling materials, as described in U.S. Pat. No. 3,066,112. In the form of particulate materials, the refractory products can be used as fillers and/or coloring agents or pigments for paints and enamels, such as water-based paints or alkyd-resin paints.

Metal matrix composites have had generally only limited application heretofore, one major reason being the lack of reinforcement materials which will withstand the elevated temperatures encountered in processing, e.g. casting and sintering temperatures. The refractory products of this invention, because of their thermal stability, strength, flexibility and other properties, are useful as reinforcements, particularly in their fiber form, for metal composites, such as shaped or cast articles made of aluminum, copper, magnesium, and nickel. Here, too, the prior art methods of incorporating reinforcements in metal matrix composites can be used, reference being made to "Fiber - Strengthened Metallic Composites," ASTM Spc. Tech. Pub. No. 427, published by the American Society for Testing and Materials, Philadelphia, Pa. (1967).

The refractory products of this invention can also be used as reinforcement for ceramic composites, such as silica, glass, aluminum silicate, and other inorganic materials, such reinforced ceramics being in the form of blocks, paper, and other shaped articles used in high temperature environments.

The refractory products of this invention can also be used as abrasion resistant and/or reinforcing agents (especially as fibers or in particulate form) for elastomeric materials, such as rubber, e.g. natural rubber, styrene-butadiene rubber (SBR), acrylonitrile-butadiene rubber (NBR), and neoprene (WRT), for example where such rubbers are used in making passengare-car or truck tires.

The objects and advantages of this invention are further illustrated in the following examples, but it should be understood that the particular materials used in these examples, as well as amounts thereof, and the various conditions and other details described, should not be construed to unduly limit this invention. In these examples, the various Ludox and Nalco colloidal silica products recited and used are those identified and described hereinbefore. The viscosities recited are Brookfield viscosities measured at ambient room temperature. Weight percent solids data was obtained by drying and firing in air to about 900° C.–1000° C. a sample of the dispersion. In the examples, the firing of green articles and the firing of amorphous refractory articles to higher temperatures were all carried out by firing in air in a furnace. The process and apparatus of said co-pending application Ser. No. 119,748 was used in making the fibers of Examples 16 and 17. Tensile strength data on fibers was obtained by vertically suspending a single fiber between two mounting blocks and adding weights of known value to the lower block until the fiber broke. The X-ray data reported is that obtained at room temperature with a General Electric Co. X-ray diffraction instrument, XRD-3, at 40 kv., 20 ma., using a powder diffraction camera (Debye-Scherrer) with an effective film diameter of 14.32 cm. Unless otherwise indicated, the samples were powdered samples exposed 0.5 to 2 hrs. to copper, K alpha radiation wavelength 1.5405 Angstroms, filtered through a nickel filter.

EXAMPLE 1

Concentrated HCl (4.8 ml.) was added to "Ludox AM" aqueous dispersion of colloidal silica (214 g.) to give a dispersion having a pH of 1. White "Karo" corn syrup (86 g.) was added to the dispersion to increase viscosity and the resulting mixture was filtered. "Niaproof" basic aluminum acetate powder (300 g.) was dissolved in 400 ml. of water to give an aqueous solution having a pH of about 5 and the solution was filtered. The latter solution was added to the syrup-containing aqueous dispersion of colloidal silica. The resulting mixture was concentrated in a "Rotavapor" rotating flask partially immersed in a water bath, the temperature of the bath gradually being raised to 35° C. The viscosity of the resulting liquid concentrate was about 75,000 cps. Fibers were formed by extruding this concentrate through a spinnerette having 30 holes, each with a 4-mil diameter, at about 150 to 180 p.s.i., and drawing the resulting extruded fibers at a rate of 100 to 130 ft./min. on a rotating 24″ diameter drum having a cylindrical polyester film facing. The resulting continuous green fibers were dried by room temperature air as they were pulled 6′ from the spinnerette verticaly downward to the drum. The fibers were cut and removed from the drum in 6′ long bundles and placed in an electric air atmosphere oven, heated from room temperature to 950° C., and held at 950° C. for 1 hr. Some of the resulting fired fiber bundles were further heated to 1150° C. and some to 1400° C. The 950° C.- and 1150° C.-fired fibers were continuous, transparent, colorless, clear, and strong. The 1400° C.-fired fibers ranged from transparent-to-translucent-to opaque and were weak and fragile. The final over-all calculated composition of these fired aluminum borosilicate fibers was $3Al_2O_3:1B_2O_3:3SiO_2$.

The density of the fired fibers varied between 2.65 and 2.80 g./cc. The modulus of elasticity for the 950° C.-fired fibers varied between 20.4 and $25.8 \times 10^6$ p.s.i. The 1150° C.-fired fibers had a modulus of elasticity of 15 to $18.5 \times 10^6$ p.s.i. The fibers fired at 1400° C. had a modulus of elasticity of 16.8 to $19 \times 10^6$ p.s.i. X-ray di diffraction patterns of the various fired fibers were run and the pertinent, distinctive portions of the patterns were found to be as follows:

| Firing temp., ° C. | Relative intensities of pertinent diffraction lines | |
|---|---|---|
| | 5.4 | 3.4 |
| 950 | 100 | 40 |
| 1,150 | 100 | 60 |
| 1,400 | 40 | 100 |

Note that the relative intensities of the 5.4 and 3.4 diffraction lines of the 950° C.- and 1150° C.-fired fibers are significantly different from those of the characteristic mullite pattern (Powder Diffraction File Card 15–776). These differences in relative intensities are such that the 950° C.- and 1150° C.-fired fibers can be characterized as having a "reverse mullite" X-ray diffraction pattern, whereas the corresponding relative intensities for the 1400° C.-fired fibers are consistent with those of mullite. No. diffraction line at 4.35 or free alumina were discernible in the X-ray diffraction patterns of the three samples.

EXAMPLE 2

Dimethylformamide (102 g.) was stirred into "Ludox LS" aqueous colloidal dispersion of silica (510 g.). The resulting mixture was poured into an agitating solution of 720 g. of "Niaproof" basic aluminum acetate dissolved in 960 ml. of water. The resulting mixture was filtered and concentrated in a "Rotavapor" flask partially immersed in a 27°–30° C. water bath during concentration. The resulting viscous concentrate was centrifuged and had an equivalent inorganic oxide solids content of 36 wt. percent and a viscosity of 60,000 cps. Fibers were spun from the concentrate using a 30-hole, 4-mil diameter spinnerette with a pressure of 120–150 p.s.i. Take-up of the resulting continuous fibers on a reel was 180 ft./min. The green fibers were pre-fired in hanks from room temperature to 600° C. over a period of 2 hrs. and then held at 600° C. for 1 hr. Additional hanks of the 600° C.-fired fibers were subsequently fired at 800° C. for 1 hr. and some of the 800° C.-fired fibers were then fired at 1000° C. for 1 hr. Some of the 1000° C.-fired fibers were further fired for 1 hr. at 1200° C. and others at 1400° C. for 1 hr. The over-all calculated composition of these aluminum borosilicate fibers was $3Al_2O_3:1B_2O_3:3SiO_2$.

The 600° C.-, 800° C.-, 1000° C.- and 1200° C.-fired fibers were continuous, transparent, colorless and shiny. The 1400° C.-fired fibers had a bluish haze, but under microscopic examination were transparent. The diameter of the various fibers was 10 to 20 microns.

The tensile strength of 1000° C.-fired fibers varied between 59,000 p.s.i. and 246,000 p.s.i. The 1200° C.-fired fibers had tensile strengths of 164,000 p.s.i. to 310,000 p.s.i.

X-ray diffraction analysis of the fibers fired at the higher temperatures showed the following:

| Firing temp., ° C. | Relative intensities of diffraction lines | |
|---|---|---|
| | 5.4 | 3.4 |
| 1,000 | 100 | 70 |
| 1,200 | 100 | 85 |
| 1,400 | 90 | 100 |

Again, note the "reverse mullite" pattern obtained for these fibers. Further, no free alumina or diffraction line at 4.35 were discernible in these X-ray patterns, nor was the characteristic relative intensities of the 5.4 and 3.4 diffraction lines for a mullite pattern discerned even at 1400° C.

EXAMPLE 3

Aluminum borosilicate fibers, having an over-all calculated composition of $3Al_2O_3:1B_2O_3:3SiO_2$, were made in three runs using different aqueous colloidal silica materials. The following procedure was followed in preparing the fibers in each run:

Step 1—Concentrated nitric acid was added to a rapidly agitated aqueous colloidal silica dispersion.
Step 2—Corn syrup was stirred into the acidified colloidal silica dispersion.
Step 3—"Niaproof" basic aluminum acetate was dissolved in water and the syrup-silica dispersion was stirred into the Niaproof solution and the pH of the resulting mixture measured.
Step 4—The mixture formed in Step 3 was filtered.
Step 5—The filtered mixture was concentrated in a Rotavapor and the viscosity of the concentrate measured.
Step 6—The concentrate was centrifuged at 2500 r.p.m. for 10 min.
Step 7—The centrifuged concentrate was spun into fibers, the spun green fibers being taken up on a drum.
Step 8—The fibers were removed from the drum and fired from room temperature to 1000° C.

Data on the three runs are tabulated below:

| | Runs | | |
|---|---|---|---|
| | 1 | 2 | 3 |
| Amt. HNO₃ used, ml | 10 | 7 | 7 |
| Aq. colloidal silica used: | | | |
| Type | (a) | (b) | (c) |
| Amt., g | 214 | 142 | 142 |
| Amt. syrup used, g | 50 | 33 | 33 |
| Niaproof soln. used: | | | |
| Amt., g | 700 | 515 | 500 |
| Conc., wt. percent | 43 | 39 | 40 |
| pH | 3.5 | 5 | 5 |
| Viscosity of concentrate, cps | 140,000 | 180,000 | 160,000 |
| Spinnerette used: | | | |
| Number of holes | 30 | 30 | 30 |
| Diameter of holes, mils | 3 | 4 | 4 |
| Take-up rate, ft./min | 200 | (d) | 250 | a Ludox AM.
b Ludox LS.
c Ludox SM.
d The fibers in this run were drawn 7' by their own weight.

All fired fibers were glossy, transparent, continuous, clear and colorless. The X-ray diffraction pattern was run on the fired fibers of Run 1 and was found to be similar to that of the 950° C.-fired fibers of Example 1. A fired sample similar to Run 1 was analyzed by chemical methods, and the following results were obtained:

Found (wt. percent): Al, 29.4; B, 3.89; Si, 15.2. Calc. for $3Al_2O_3:1B_2O_3:3SiO_2$ (wt. percent): Al, 29.1; B, 3.89; Si, 15.2.

EXAMPLE 4

"Niacet" aluminum formoacetate powder (88.8 g.) was dissolved in 150 ml. water heated to 70° C. Boric acid (12.4 g.) was dissolved in 50 ml. of warm water, and this solution was poured into the agitated formoacetate solution. "Nalco 1034A" aqueous colloidal silica (51.6 g.) was stirred into the Niacet-boric acid solution and the resulting mixture, which had a pH of 4, was filtered. The dispersion was concentrated in a Rotavapor flask in a 40° C. water bath. The water bath temperature was elevated to 70–80° C. to prevent crystallization. Continuous fibers were spun from the viscous concentrate contained in a chamber heated with hot tap water, through a 6-hole, 3-mil spinnerette at 180 p.s.i. pressure and taken up on a 6" diameter drum at 135 ft./min. Fibers were fired in air from room temperature to 600° C. and held for 1 hr. at that temperature. Fibers were strong, transparent and clear. Tensile strength was between 116,000 and 170,000 p.s.i. The fibers had the calculated composition $3Al_2O_3:1B_2O_3:3SiO_2$.

EXAMPLE 5

Concentrated nitric acid (2.5 ml.) was poured into agitated "Ludox-LS" aqueous colloidal silica (428 g.). "Niaproof" basic aluminum acetate powder (600 g.) was dissolved in 800 g. of deionized water. Then, the acidified colloidal silica dispersion was poured into the aqueous agitated Niaproof solution. The resulting mixture was filtered, concentrated, centrifuged, spun and fired as described in Example 1. Hanks of the resulting continuous green fibers were fired from room temperature to 600° C. in 1 hr. Portions of the 600° C.-fired fibers were fired at various higher temperatures for 1 hr., viz., 800, 900, 1000, and 1400° C.

The calculated composition of the aluminum borosilicate fibers was $3Al_2O_3:1B_2O_3:3SiO_2$. The diameter of the fired fibers was 10 to 17.5 microns. Properties of the fired fibers were found to be as follows:

| Firing temp., ° C. | Density, g./cc. | Modulus of elasticity, p.s.i.×10⁶ | Tensile strength, p.s.i. | Relative intensities of X-ray diffraction lines | |
|---|---|---|---|---|---|
| | | | | 5.4 | 3.4 |
| 600 | 2.19 | 7.6–8.4 | | | |
| 800 | 2.48 | 7.5–12.5 | 148,000 | Amorphous | |
| 900 | 2.60 | 12.3–17.0 | 180,000 | 100 | 60 |
| 1,000 | 2.60 | 14.2–17.8 | 161,000 | 100 | 90 |
| 1,400 | | | | 40 | 100 |

No free alumina was detected in the X-ray diffraction patterns. Examination by electron microscopy revealed the size of the crystallites of the fibers fired at 1000° C. to be between about 500 A. and 1000 A.

EXAMPLE 6

Concentrated $HNO_3$ (3.3 ml.) was stirred into "Ludox AM" aqueous colloidal silica (71.3 g.) and corn syrup (16.6 g.) was added to the acidified silica dispersion. A solution of 4.5 g. of $CrO_3$ in 25 ml. $H_2O$ was stirred into the silica-syrup dispersion and the resulting mixture (having a pH of 4.5) was added to a solution of "Niaproof" basic aluminum acetate (100 g.) in 125 ml. $H_2O$. The resulting mixture was dark green in color and was filtered and concentrated in a Rotavapor flask. The resulting filtered concentrate had a viscosity of 48,000 cps. and was spun through a 30-hole (3-mil diameter) spinnerette at 125 p.s.i., at a rate of 275 ft./min., and wound on a drum. The resulting continuous green fibers were removed from the drum and fired from room temperature to 500° C. in 1 hr. The fired fibers were clear, strong, and pastel green in color and about 15 microns in diameter. Some of the 500° C.-fired fibers were further fired at 700° C. for ¾ hr. and others at 900° C. for ¾ hr. The resulting 700° C.- and 900° C.-fired fibers were green in color, transparent, clear and very strong. The aluminum borosilicate fibers had a calculated composition of 95 wt. percent $3Al_2O_3:1B_2O_3:3SiO_2$ plus 5 wt. percent $Cr_2O_3$.

EXAMPLE 7

"Niaproof" basic aluminum acetate powder (240 g.) was dissolved in 400 ml. distilled water. The solution was filtered and concentrated in a Rotavapor flask using a 32°–36° C. water bath. The clear, viscous concentrate was centrifuged to remove entrapped air or gas. The resulting centrifuged concentrate contained 28.5 wt. percent solids and had a viscosity of 100,000 to 150,000 cps. Fibers were formed by extruding this solution through a 30-hole, 4-mil diameter spinnerette at pressures of 120 to 140 p.s.i. The resulting continuous green fibers were air dried at about 50° C. and various samples were fired from room temperature to 600° C., 800° C., 1000° C., and some of the 1000° C.-fired fibers were further fired to 1200° C. The fibers fired to and including 1000° C. were shiny, clear, transparent, and colorless. The fibers fired to 1200° C. were opaque, weak and fragile. The calculated composition of the aluminum borate fibers was $$3Al_2O_3:1B_2O_3.$$

The fibers, fired at 1000° C. and at 1200° C. for ½ hr. showed an X-ray diffraction pattern consistent with the $9Al_2O_3 \cdot 2B_2O_3$ structure. The tensile strength of the fibers fired to 1000° C. was 150,000 p.s.i., and the modulus of elasticity was $22.5 \times 10^6$ p.s.i. Fiber diameter averaged about 12 microns, and density was 2.90 g./cc. Firing 1000° C.-fired fibers at 1400° C. for ½ hr. caused some loss of boria since the X-ray diffraction pattern showed a major $9AlO_3 \cdot 2B_2O_3$ and a minor alpha $Al_2O_3$ structure.

EXAMPLE 8

Aqueous colloidal silica dispersion ("Nalco 1034-A," 24.6 g.) was stirred into "Niaproof" basic aluminum acetate (241 g.) which had been dissolved in 360 ml. $H_2O$. The mixture was filtered and concentrated in a Rotavopor flask at a bath temperature of 32° to 37° C. until it was viscous enough to enable the pulling of fibers therefrom with a glass rod. The concentrate was centrifuged to eliminate bubbles. The viscosity of the clear centrifuged mixture was 72,000 cps. and it had a solids content of 30.8 wt. percent. Fibers were spun as described in Example 7 using a pressure of 180–200 p.s.i. and a spinning rate of 210–290 ft./min. Three batches of the fibers were fired from room temperature to 600° C., 800° C., or 1000° C. One portion of the 1000° C.-fired fibers was further fired 1 hr. at 1200° C. and another portion at 1400° C. for 1 hr.

The 600° C.-, 800° C.- and 1000° C.-fired fibers were transparent, clear and colorless, and the 1200° C.- and 1400° C.-fired fibers were somewhat translucent. The aluminum borosilicate fibers were 10–20 microns in diameter and had a calculated composition of $$3Al_2O_3:1B_2O_3:0.5SiO_2.$$

X-ray examination of the fibers gave the following:

| Firing temp., ° C. | Relative intensities of diffraction lines | | |
| --- | --- | --- | --- |
| | 5.4 | 4.35 | 3.4 |
| 1,000 | 100 | 0 | 50 |
| 1,200 | 100 | 5 | 50 |
| 1,400 | 100 | 15 | 75 |

The 1000° C.-fired fibers had a modulus of elasticity of about $23.3 \times 10^6$ p.s.i., a tensile strength of about 168,000 p.s.i., and a density of 2.9 g./cc.

EXAMPLE 9

The formulation used in this example resulted in refractory aluminum borosilicate fibers of $$3Al_2O_3:1B_2O_3:1.5SiO_2.$$

"Niaproof" basic aluminum acetate (211 g.) was dissolved in 400 ml. $H_2O$ and into the solution was poured, with agitation, an aqueous colloidal silica ("Nalco 1034–A," 64.5 g.). The resulting mixture was concentrated in a Rotavapor flask and centrifuged and yielded a concentrate with a viscosity of 74,000 cps. and an equivalent solids content of 33.8 wt. percent. Fibers were spun from this clear viscous concentrate through a 30-hole, 4-mil spinnerette at about 120 p.s.i. and drawn on a reel at 155 ft./min. The continuous, green fibers were fired by heating from room temperature to 800° C. or 1000° C. and held at such temperature for 1 hr. A sample of the 1000° C.-fired fibers was heated to 1450° C. The density of the 1000° C.-fired fibers was 2.70 g./cc. The X-ray diffraction analysis and modulus of elasticity were found as follows:

| Firing temp., ° C. | Relative intensities of diffraction lines | | | Modulus of elasticity, p.s.i.×10⁶ |
| --- | --- | --- | --- | --- |
| | 5.4 | 4.35 | 3.4 | |
| 800 | Amorphous | | | |
| 1,000 | 100 | 0 | 60 | 20.9 |
| 1,450 | 60 | 3 | 100 | 34.0 |

No free alumina crystallites were discernible in the X-ray analysis. The fired fibers were 10 to 15 microns in diameter and clear, transparent and colorless.

EXAMPLE 10

Aluminum borosilicate fibers having the calculated composition $3Al_2O_3:1B_2O_3:2SiO_2$ were formed from the formulation:

| | G. |
| --- | --- |
| "Niaproof" basic aluminum acetate in 400 ml. $H_2O$ | 211 |
| "Nalco 1034–A" aqueous colloidal silica dispersion | 86 |

The colloidal silica dispersion was stirred into the solution of Niaproof. The resulting mixture (pH 5) was filtered and concentrated in a Rotavapor flask using a 40° C. water bath. This procedure produced a clear to slightly hazy, viscous mixture which was centrifuged to remove gases and bubbles. The final viscous concentrate had a viscosity of 40,000 cps.

The viscous concentrate was spun through a 30-hole, 4-mil hole diameter spinnerette at 150 p.s.i. with a take-up speed of 175 ft./min. Strands of the resulting continuous green fibers were fired from room temperature to 1000° C. over a 4–5 hr. period. The fired fibers were shiny, continuous, colorless, and transparent. They had a tensile strength of about 118,600 p.s.i., a modulus of elasticity of about $16.5 \times 10^6$ p.s.i., a density of 2.68, and an X-ray diffraction pattern with the relative intensities of the 5.3 or 3.4 diffraction lines being 100 and 40, respectively and no discernible free alumina or other crystalline species.

In a similar run, 105 g. Niaproof in 200 ml. water and 50 g. Nalco 1030 were used in making up the concentrate with a calculated equivalent composition of $$3Al_2O_3:1B_2O_3:2SiO_2$$

The fibers spun from the concentrate were fired at 900° C., and some further fired at 1000° C. The 900° C.-fired fibers were continuous, transparent, and had a tensile strength of about 190,000 p.s.i. The 1000° C.-fired fibers were continuous, transparent, had a index of refraction of 1.572 to 1.580, and had a tensile strength of about 200,000 p.s.i.

EXAMPLE 11

In each of three runs, using different equivalent mol ratios of metal oxides, colloida silica dispersion ("Nalco 1034–A") was stirred into a water solution of "Niaproof"

basic aluminum acetate and the resulting dispersion was filtered and concentrated (using a Rotavapor flask) and centrifuged. The viscosity and solids content of the concentrate was measured. The concentrate was spun through a 30-hole, 4-mil diameter spinnerette. These runs are summarized below.

| | Runs | | |
|---|---|---|---|
| | 1 | 2 | 3 |
| Amt. Nalco 1034A used, g | 172 | 206 | 287 |
| Aq. Niaproof soln. used: | | | |
| Amt., g | 611 | 469 | 340 |
| Conc., wt. percent | 34.5 | 36.0 | 41.2 |
| Concentrate: | | | |
| Viscosity, cps | 112,000 | 80,000 | 206,000 |
| Solids, wt. percent | 40.2 | | 48.2 |
| Extrusion pressure, p.s.i | 160 | 100-200 | 60 |
| Take-up rate, ft./min | 175 | 150-320 | 190 |
| Calc. mol ratios of fibers, $Al_2O_3:B_2O_3:SiO_2$ | 3:1:4 | 3:1:6 | 3:1:10 |

In each run, the fibers were fired from room temperature to 600° C. over a 3–4 hr. period and those of Runs 2 and 3 held at 600° C. for ½ to 1 hr. Batches of the 600° C.-fired fibers were subsequently fired without cooling to 800° C. over a 1 hr. period and those of Runs 2 and 3 held at 800° C. for 1 hr. Some of the 800° C.-fired fibers were fired to 1000° C. over a 2-hr. period and those of Runs 2 and 3 were held at 1000° C. for about 1 hr. And some of the 1000° C.-fired fibers were subsequently fired at 1200° C. for ½ hr. and at 1400° C. for ½ hr. The fired fibers were transparent, clear, shiny, and essentially continuous. The properties of the fibers are tabulated below.

| Firing temp.,° C. | $I_{rel}$[1] | | Tensile strength, p.s.i. | Modulus of elasticity, p.s.i.×10⁶ | Density, g./cc. |
|---|---|---|---|---|---|
| | 5.4 | 3.4 | | | |
| $3Al_2O_3:1B_2O_3:4SiO_2$ fibers: | | | | | |
| 800 | Amorphous | | | | |
| 1,000 | 100 | 50 | 106,000 | 15.5 | 2.6 |
| 1,200 | 100 | 100 | 160,000 | 14.0 | 2.7 |
| 1,400 | 90 | 100 | 94,000 | 15.5 | |
| $3Al_2O_3:1B_2O_3:6SiO_2$ fibers: | | | | | |
| 1,000 | 100 | 70 | 125,000 | 14.0 | 2.5 |
| 1,200 | 100 | 100 | 95,000 | 15.5 | 2.6 |
| 1,400 | 50 | 100 | | 13.5 | |
| $3Al_2O_3:1B_2O_3:10SiO_2$ fibers: | | | | | |
| 1,000 | 100 | 70 | 112,000 | 12.0 | 2.4 |
| 1,200 | 90 | 100 | 96,000 | 12.0 | 2.6 |
| 1,400 | 35 | 100 | | | |

[1] No free alumina or other crystalline species were discernible in the X-ray analysis of any run.

EXAMPLE 12

In a series of runs, fibers were made having the calculated composition $3Al_2O_3:1.5B_2O_3:xSiO_2$ where $x$ was varied between 0 and 3. In these runs, boric acid was dissolved in warm water and mixed with an aqueous solution of "Niaproof" basic aluminum acetate (with or without added aluminum chloride). Aqueous colloidal silica dispersion was added to the Niaproof-boric acid solution (in all runs except Run 1) and the mixture filtered. The filtered, clear dispersion was concentrated in a Rotavapor flask. The viscous concentrate was centrifuged and fibers were spun using a 30-hole, 4-mil diameter spinnerette, except Runs 3 and 4, where a 6-hole, 3-mil spinnerette was used. These runs are summarized below:

| | Runs | | | |
|---|---|---|---|---|
| | 1 | 2 | 3[1] | 4 |
| Calc. mol ratio of fibers, $Al_2O_3:B_2O_3:SiO_2$ | 3:1.5:0 | 3:1.5:0.5 | 3:1.5:2 | 3:1.5:3 |
| Amt. Nalco 1034-A used, g | 0 | 17.2 | 34.4 | 51.6 |
| Aq. Niaproof soln. used: | | | | |
| Amt., g | 561 | 469 | 204 | 214 |
| Conc., wt. percent | 37.6 | 36.0 | 36.3 | 39.4 |
| Aq. $H_3BO_3$ soln. used: | | | | |
| Amt., g | 90 | 62 | 38 | 46 |
| Conc. wt. percent | 17.1 | 20 | 20 | 13.4 |
| Viscosity of concentrate, cps | | 124,000 | | |
| Extrusion pressure, p.s.i | 180-200 | 240 | 180 | 150 |
| Take-up rate, ft./min | 50 | 150 | 40 | |

[1] Niaproof soln. in this run was also mixed with a soln. of 16 g. $AlCl_3·6H_2O$ in 20 ml. water.

The fibers from the various runs were dried and fired at 600° C. for about an hour and the resulting fired fibers were transparent and fairly strong, except those of Run 1, which were somewhat weak. The 600° C.-fired fibers of Runs 1, 2, and 4 were further fired at 800° C. for up to 1 hr. and the 800° C.-fired fibers further fired at 1000° C. for about an hour, the 800° C.- and 1000° C.-fired fibers having substantially the same properties as the 600° C.-fired fibers. The 600° C.- and 800° C.-fired fibers of Run 3 were also transparent and fairly strong and the 1000° C.-fired fibers of this run were transparent to translucent with some loss of structural integrity. X-ray diffraction pattern of 1000° C.-fired fibers of Run 1, $$3Al_2O_3:1.5B_2O_3,$$

showed relative intensities for the 5.4 and 3.4 diffraction lines of 100 and 30, respectively. The 1000° C.-fired fibers from Run 4, $3Al_2O_3:1.5B_2O_3:3SiO_2$, showed relative intensities for the 5.4, 4.35, and 3.4 diffraction lines of 100, 3, and 40, respectively. No free alumina or other crystalline species were discerned in these X-ray analyses.

EXAMPLE 13

In a series of runs, fibers having the calculated composition $9Al_2O_3:2B_2O_3:xSiO_2$ were prepared where $x$ varied between 0 and 6. The manipulative procedure used for preparing the viscous concentrate, spinning and firing the fibers was the same as used in Example 12. Data on the preparation and properties of the fibers are given below:

| | Runs | | |
|---|---|---|---|
| | 1 | 2 | 3 |
| Calc. mol ratio of fibers, $Al_2O_3:B_2O_3:SiO_2$ | 9:2:0 | 9:2:0.33 | 9:2:6 |
| Nalco 1034A used, g | 0 | 0 | 115 |
| Ludox LS used, g | 0 | 3.3 | 0 |
| Aq. Niaproof soln. used: | | | |
| Amt., g | 469 | *240 | 487 |
| Conc., wt. percent | 36.0 | *35 | 39.3 |
| Aq. Niacet soln. used: | | | |
| Amt., g | 289 | | |
| Conc., wt. percent | 30.8 | | |
| Aq. $AlCl_3·6H_2O$ used: | | | |
| Amt., g | | *161 | 361 |
| Conc., wt. percent | | *45 | 44.6 |
| Concentrate: | | | |
| Viscosity, cps | 136,000 | 108,000 | 87,000 |
| Solids, wt. percent | | | 32.8 |
| Extrusion pressure, p.s.i | 320 | 120 | 120-320 |
| Take-up rate, ft./min | 190 | 150 | 175-250 |
| Diameter of fired fibers, microns | 12-20 | | 11-16 |

* Estimated values.

The fibers from the various runs were fired at various temperatures and the properties determined on the fired fibers from Runs 1 and 3 summarized below.

| Run | Firing temp., ° C. | $I_{rel}$[1] | | | Tensile strength, p.s.i. | Modulus of elasticity p.s.i.×10⁶ | Density, g./cc. |
|---|---|---|---|---|---|---|---|
| | | 5.4 | 4.35 | 3.4 | | | |
| $9Al_2O_3:2B_2O_3:0SiO_2$ fibers: | | | | | | | |
| 1A | 600 | | | | | 12 | 2.35 |
| 1B | 800 | 100 | 0 | 40 | | 17 | 2.73 |
| 1C | 900 | | | | | | |
| 1D[2] | 1,000 | 100 | 0 | 40 | | 23 | 2.77 |
| 1E[3] | 1,000 | 100 | 20 | 40 | | | |
| $9Al_2O_3:2B_2O_3:6SiO_2$ fibers: | | | | | | | |
| 2A | 800 | 100 | 0 | 40 | 155,000 | | 2.66 |
| 2B | 900 | | | | 171,000 | | |
| 2C | 1,000 | 100 | 0 | 40 | | 15 | 2.68 |
| 2D | 1,200 | 100 | Diffuse | 70 | | | 2.70 |
| 2E | 1,450 | 40 | Diffuse | 100 | | | |

[1] No free alumina or other crystalline species discerned in any of these analyses.
[2] The fibers in this run were heated to 1,000° C.
[3] The fibers in this run were heated to 1,000° C. and held at 1,000° C. for ¾ hr.

The fired fibers of Runs 1 and 3 were continuous, clear, transparent, and strong, whereas those of Run 2 were transparent-to-translucent-to-opaque and were weaker.

EXAMPLE 14

"Ludox-LS" aqueous colloidal silica (470 g.) was mixed with 4 ml. $HNO_3$ and the resulting dispersion stirred with a high shear mixer into a solution of 660 g. 'Niaproof" basic aluminum acetate in 440 ml. water plus 346 g. methanol. Four-tenths g. of "Polyox" polyoxyethylene was added to the mixture to aid in fiberizing. The resulting mixture was filtered, concentrated in a Rotavapor flask, and centrifuged to form a clear viscous concentrate with a viscosity of 750,000 cps. having a solids content of 36.8 wt. percent. This concentrate was spun using a 40-hole, 3-mil diameter spinnerette and an extrusion pressure of 800 p.s.i. The fibers were drawn together at a rate of 200 ft./min. and sized with 3M FC–40 fluorocarbon. The fiber strand was allowed to fall in a random "figure 8" pattern on an aluminum belt and pre-fired by passage through a furnace at 454° C. for 10 min. The fiber strand, after pre-firing, was sized with 5 wt. percent Triton X–155 sizing agent in methanol and wound on cones for storage. The cones of yarn were fired at 1000° C. for 1 hr. The calculated composition of these continuous fibers after firing was $3Al_2O_3:1B_2O_3:3SiO_2$ and they had a density of 2.65 g./cc. and a diameter of 12–15 microns. The fired yarn was relubricated with 5% Triton X–155 in methanol and then woven into a piece of cloth 3½" x 11" on a 38 warp loom. The resulting fabric was white, shiny, strong, flexible and capable of withstanding temperatures in excess of 1000° C. The individual fibers in the yarn used to make this cloth were clear, transparent, shiny, flexible, strong and continuous.

EXAMPLE 15

Fibers with a calculated composition of $$3Al_2O_3:1B_2O_3:3SiO_2$$

were prepared as described in Example 2. The fibers were formed into a strand as described in Example 14 and pre-fired at 550°–600° C. for 10 min. Ten pre-fired strands were wound together to form yarn and the yarn was fired by pulling it continuously through an air atmosphere furnace, having a 4 foot 980° C. hot zone, at a rate of 2 ft./min. This yarn was sized and laid up seven-ply in a composite using a heat-curable epoxy novolak resin, each ply consisting of a layer of yarn and a layer of resin. The composite was cured at 320° F. and 480 p.s.i. for 1 hr. The loading of the cured composite was 68.9 vol. percent fibers. The modulus of elasticity determined by flexure test was $14 \times 10^6$ p.s.i. The resin without the fibers is known to have a modulus of elasticity determined in the same way of about $0.5 \times 10^6$ p.s.i.

EXAMPLE 16

"Niaproof" basic aluminum acetate (815 g.) was dissolved in 1090 g. water. "Ludox LS" aqueous dispersion of colloidal silica (576 g.) was mixed with dimethylformamide (116 g.) and the resulting mixture then mixed with the Niaproof solution. The resulting formulation was concentrated in a Rotavapor flask at a water bath temperature of 27–32° C. over a period of 4 hrs. to yield a liquid concentrate amounting to 1518 g. The concentrate was centrifuged to remove air bubbles and pumped from a vessel under 60 p.s.i. pressure to a pump. The discharge from the pump was fed to a 40-hole, 3-mil spinnerette and extruded therefrom at 200–500 p.s.i. The resulting extruded fibers were drawn vertically downward through the center of a drying stack, 4 ft. in length and 9" in diameter, in a concurrent stream of dry air introduced into the upper end of the stack at about 38° C. and withdrawn from the lower end of the stack at about 29° C. The green fibers issuing from the bottom of the stack were brought together by a guide to form a compact strand, the strand turned to a generally horizontal plane, and passed under a wick soaked with FC–40 fluorocarbon lubricant. The lubricated strand was passed over a pair of counter-rotating Godel rolls, each 6" in diameter, to draw the fibers at 200 ft./min., and the fibers, in the form of the strand, allowed to fall 2' by gravity and accumulate in a relaxed manner on a horizontally moving, continuous belt. The moving belt was a 12" wide nylon open mesh skrim. As the belt moved, the strand continuously collapsed thereon, the lower end of the strand moving back and forth laterally on the belt and accumulated thereon in the form of superimposed "figure 8" loops. The belt continuously passed around a perforated stationary cylinder at one extremity and around a drive roll at the other extremity. As the accumulated pile of the strand on the belt reached the extremity of its travel adjacent the stationary cylinder, it was held on the belt by a slight vacuum obtained by drawing air through the belt into the cylinder, holding the pile on the belt until the pile reached its lower-most point of travel. Thereupon, the pile continuously fell from the belt under gravity and deposited on a horizontally moving belt made of a sheet of stainless steel which moved in a direction opposite to the direction the top of the skrim belt moved when the strand was initially accumulated. A static eliminator bar was disposed adjacent the outer surface of the cylinder at a point just beyond that where the pile dropped from the skrim belt. The pile on the stainless steel belt retained its relaxed configuration except that it in effect was turned over. The stainless steel belt carried the pile through a three-zone Globar furnace. The first zone of the furnace was about 6' long, the entry temperature being about 100° C. and its hottest point being about 550° C. In this zone, the pile was pre-fired to remove water and other volatile material such as solvents, decomposed organic material, and initiate the sintering of the strand of fibers, the strand first turning brown, then black, then white again as the carbonaceous material was oxidized and removed therefrom. In the second and third zones of the furnace, the temperatures gradually increased to about 870° C., causing removal of residual volatile material and the conversion of the strand into a refractory material with consequent gross linear shrinkage. The pre-fired strand of fibers exiting from the pre-fired furnace was pulled from the stainless steel belt through a series of variable tensioning cylinders and passed as a straight strand through a 6' tube furnace maintained at about 1000° C. The rate of travel through the tube furnace was about 125 ft./min. As the strand passed through the tube furnace, kinks were removed therefrom and the strand further densified. At the discharge end of the tube furnace, the strand was sprayed with a size and wound around a core. The fibers in the fired strand were continuous, transparent, clear, colorless, glossy, round, strong, and had the calculated composition $3Al_2O_3:1B_2O_3:3SiO_2$. Said fibers had a diameter of 11–12 microns, a tensile strength of about 226,000 p.s.i., and a modulus of elasticity of about $22.6 \times 10^6$ p.s.i.

EXAMPLE 17

In this example, refractory fibers were made by a process similar to that described in Example 16, above, with exceptions hereinafter noted.

The concentrate used to spin the fibers was made up of 2160 g. of "Niaproof" in 2880 ml. water, 1530 g. "Ludox LS" mixed with 306 g. dimethyl formamide, and 123 g. of $CrO_3$, which was added to all the foregoing materials after they were mixed together in a manner described in said Example 16. The concentrate had a viscosity of 120,000 cps. and was spun in a manner similar to that of Example 16, except that the stack in which the fibers were drawn employed a counter-current stream of dry air introduced at about 35° C. into the bottom of the stack and withdrawn at the top thereof at about 29° C. The maximum temperature of the pre-fire furnace was about 880° C., the stainless steel belt speed was 15"/min. The strand pulled from the pile issuing from the exit of the pre-fire furnace, after passing the tension cylinders, was subjected to additional tension by passing through a reverse aspirator disposed just up-stream of the tube furnace. The fibers in the strand were continuous, transparent, green in color, glossy, round, and strong and had the calculated composition 95 wt. percent $$3Al_2O_3:1B_2O_3:3SiO_2$$

and 5 wt. percent $Cr_2O_3$. Said fibers had a diameter of about 12 microns, a tensile strength of about 220,000 p.s.i, and a modulus of elasticity of about $24.2 \times 10^6$ p.s.i.

EXAMPLE 18

To a solution of 6.18 g. of boric acid in 150 g. water was added and dissolved 84.3 g. of "Niaproof" basic aluminum acetate. Two g. of concentrated HCl was added to 254 g. of "Ludox LS" aqueous colloidal silica dispersion to lower the pH to less than 2, and this dispersion was added to the aqueous boric acid-Niaproof solution. A portion (473 g.) of the resulting mixture was concentrated in a Rotavapor flask at a bath temperature of 30–35° C. The bath temperature was raised to 60° C. to re-dissolve some crystals which formed. The resulting viscous concentrate (206 g.) was mixed with 150 ml. water and 40 g. corn syrup (108,000 cps. viscosity, 1.43 g./cc. density), and the resulting mixture homogenized by agitation in a 40° C. water bath for 20 min. The resulting mixture was then concentrated at a bath temperature of 35–50° C. to produce a viscous concentrate which was extruded through a 6-hole, 3-mil spinnerette at 200 p.s.i., the resulting fibers being drawn at a rate of 100 ft./min. and collected on a rotating 6" diameter drum placed 1½ ft. below the spinnerette. The resulting green fibers were continuous, round, glossy, clear and transparent. A portion of these fibers were heated in a furnace from room temperature to 1000° C. in 2 hrs. and held at 1000° C. for 20 min. The fired fibers were continuous, clear, transparent, glossy, round and had the calculated composition $3Al_2O_3:1.5B_2O_3:12.7SiO_2$. They had an index of refraction of 1.500, an average diameter of 15.9 microns, and a tensile strength of 186,000 p.s.i. X-ray diffraction analysis of the fibers showed that they were made up in large part of an amorphous material and had crystallites with a diffuse diffraction pattern (indicating poor crystallinity) for mullite, with relative intensities for the 5.4 and 3.4 diffraction lines of 40–50 and 100, respectively.

In another run, 328 g. of "Ludox LS" aqueous colloidal silica dispersion, acidified with 2 g. of concentrated HCl to lower the pH to less than 2, was slowly added with agitation to a solution of 44.4 g. of "Niacet" aluminum formoacetate and 84.3 g. of "Niaproof" basic aluminum acetate in 200 ml. water. A portion (151 g.) of the resulting mixture was concentrated in a Rotavapor flask at a bath temperature of 46–34° C. The resulting viscous clear concentrate (70 g.) was spun through a 6-hole, 3-mil spinnerette at 150–200 p.s.i., and drawn at a rate of 100 ft./min. in a manner like that of the above run. The resulting green fibers were round, clear, transparent and colorless. They were fired from room temperature to 1000° C. over 2 hrs. and held at 1000° C. for 20 min. The fired fibers had an average diameter of about 20.5 microns, a tensile strength of about 133,000 p.s.i., an index of refraction of 1.508, and a calculated composition of $$9Al_2O_3:2B_2O_3:32.7SiO_2$$

The X-ray analysis of these fibers were identical to that described above for the first run.

EXAMPLE 19

"Ludox AM" aqueous colloidal silica dispersion (300 g.) was poured into an agitated solution of "Niaproof" basic aluminum acetate (316 g. in 300 g. water). The mixture was filtered and uniformly fed over a 20-min. period into a 100-gallon tank containing 80 gallons of 2-ethylhexanol, and agitated by a high-shear mixer. After all the mixture was introduced, the solution and the resulting solid spheres which were formed were agitated by the mixer for about 15 min. The spheres were separated from the solvents by decanting and centrifuging the mixture.

The separated spheres were oven-dried at 90° C. to remove traces of solvent from the surface and the dry spheres were 1–10 microns in diameter. The spheres were fixed from room temperature to 3000 C. over a 3-hr. period, held at 300° C. for 2 hrs. to permit out-gassing of volatiles, heated further to 100° C. over a 3-hr. period, and held at 1000° C. for ½ hr. The first spheres had the calculated composition $3Al_2O_3:1B_2O_3:4SiO_2$. The 1000° C.-fired spheres were colorless, less than 10 microns in diameter, transparent, clear and had a refractive index of 1.552 to 1.562. The following relative intensities for the pertinent portions of the X-ray diffraction patterns of these fired spheres were found.

| Firing temp., °C. | Relative intensities of diffraction lines | |
|---|---|---|
| | 5.4 | 3.4 |
| 1,000 | 100 | 90 |
| 1,100 | 100 | 100 |

No free alumina or other crystalline species were discerned.

These spheres can be incorporated as a filler into a resin, such as a methacrylate, and the composite used as a dental filling material, in the manner disclosed, for example, in U.S. Pat. 3,006,112.

EXAMPLE 20

"Niacet" aluminum formoacetate (8.9 g.) dissolved in 20 ml. warm water was stirred into 16.9 g. "Niaproof" basic aluminum acetate dissolved in 30 ml. water. The mixture was concentrated slightly and ethanol (10 ml.) was added to enhance wetting, and the resulting solution was knife-coated to a wet thickness of about 5 mils on polyester film. The thin film was dried at room temperature, and the resulting green flakes were fired from room temperature to 1000° C. Clear, transparent aluminum borate flakes were obtained having the calculated composition $9Al_2O_3:2B_2O_3$.

EXAMPLE 21

"Niaproof" basic aluminum acetate (8.44 g.) was added to a solution of boric acid (0.62 g.) in 20 ml. of water. "Nalco 1034–A" aqueous colloidal silica (6.03 g.) and one drop of "Tergitol TMN" wetting agent was added to Niaproof-boric acid solution. The resulting mixture was knife-coated on polyester film to a wet thickness of 8 mils and dried in air at room temperature. The resulting green flakes were placed in a porcelain crucible and fired from room temperature to 830° C. and some of the 830° C.-fired flakes were fired at 1000° C. The resulting fired flakes, having a calculated composition of $$3Al_2O_3:1.5B_2O_3:3.5SiO_2$$

were transparent, and those fired at 1000° C. had an index of refraction of 1.540 to 1.544.

EXAMPLE 22

"Nalco 1034A" aqueous colloidal silica dispersion (10.33 g.) was added to a solution of 8.44 g. of "Niaproof" basic aluminum acetate in 15 ml. H₂O. One drop of "Tergitol TMN" wetting agent was added to the resulting mixture. The mixture was knife-coated to a wet thickness of 8 mil on polyester film and dried at room temperature in air for several minutes. The green flakes obtained were fired at 800° C. for 1 hr. The resulting refractory aluminum borosilicate flakes, having the calculated composition $$3Al_2O_3 : 1B_2O_3 : 6SiO_2$$

were clear, transparent and colorless, and had an index of refraction of 1.528 to 1.532.

EXAMPLE 23

"Ludox AM" aqueous colloidal silica (5 g.), acidified with glacial acetic acid to give a pH of 4.0, was added to 24.5 g. of a 28.6 wt. percent aqueous solution of "Niaproof" basic aluminum acetate. An aqueous Fe(NO₃)₃ solution (containing the equivalent of 0.231 g. Fe₂O₃) was added to the mixture, imparting a yellow color thereto.

About one-half of said mixture was knife-coated on a polyester web to a wet thickness of 3 mils. The coating was air dried at room temperature. As the coating dried, it broke into fragments ranging from about ½ in.² to relatively small fragments. The flakes were easily removed from the web and placed in a porcelain crucible and fired from room temperature to 700° C. and maintained at 700° C. for 20 min. The calculated composition of the aluminum borosilicate flakes was 95.3 wt. percent $$3Al_2O_3 : 1B_2O_3 : 3SiO_2$$

and 4.7 wt. percent Fe₂O₃. The fired flakes were gold, transparent, clear, shiny and smooth.

The other one-half of the above mixture was used to make spheres by injecting it (via a hypodermic syringe with an 18 gauge needle) into 600 ml. of 2-ethylhexanol which was being rapidly agitated. The agitation was continued for 20 min. and the mixture filtered to separate the resulting solid green spheres. The spheres, light gold in color, were placed in an oven for ½ hr. and dried to remove residual 2-ethylhexanol. The spheres were then placed in a porcelain crucible and fired from room temperature to 700° C. and maintained at 700° C. for 20 min. The resulting fired spheres were transparent, clear, light gold, smooth, shiny and had diameters varying from about 15 to 200 microns.

In another run, the same quantities of raw materials were used in the same procedure described above, except that 0.898 g. of Ni(NO₃)₂·6H₂O was added to the Niaproof Ludox-acetic acid-water dispersion in place of the ferric nitrate solution. Flakes and spheres were prepared as described above. The fired flake and sphere products were light gold, clear, transparent, smooth and shiny.

Various modifications and alterations of this invention will become apparent to those skilled in the art without departing from the scope and spirit of this invention, and it should be understood that this invention is not to be unduly limited to the illustrative embodiment set forth herein.

What is claimed is:

1. A shaped and fired solid transparent refractory article having an alumina:boria mol ratio of 9:2 to 3:1.5.
2. The refractory article of claim 1 wherein said ratio is 9:2 to 3:1⅓.
3. The refractory according to claim 1 wherein said ratio is 9:2.
4. The refractory article of claim 1 free of crystalline alumina.
5. The refractory article of claim 1 in the form of continuous fibers.
6. The refractory article of claim 1 in the form of microspheres.
7. The refractory article of claim 1 in its amorphous form.
8. The refractory article of claim 1 comprising aluminum borate in its crystalline form.
9. A shaped and fired solid transparent refractory article comprising crystalline aluminum borosilicate within the boundary defined by A, B, C, and D and along the boundary lines B–C, C–D and D–A of FIG. 1 of the accompanying drawing.
10. The refractory article of claim 9 free of crystalline alumina.
11. The refractory article of claim 9 wherein the equivalent amount of silica present is in the range of 20 to 50 weight percent, and the equivalent alumina:boria mol ratio is 9:2 to 3:1⅓.
12. The refractory article of claim 9 having a crystalline species whose X-ray diffraction pattern contains diffraction lines 5.4, 4.35 and 3.4 whose relative intensities are 60 to 100, 0 to 50, and 40 to 80, respectively.
13. The refractory article of claim 9 wherein said aluminum borosilicate comprises crystallites between 500 A. and 1000 A. in size.
14. The refractory article of claim 9 in the form of continuous fibers.
15. The refractory article of claim 9 in the form of microspheres.
16. The refractory article of claim 9 further comprising an amount of a metal oxide sufficient to impart a color thereto.
17. The refractory article of claim 9 further comprising 0.5 to 25 weight percent of a metal oxide.
18. The refractory article of claim 17 wherein said metal oxide is chromia.
19. Fired transparent continuous refractory fibers comprising aluminum borosilicate crystallites whose composition falls within the boundary defined by A, B, C, and D and along the boundary lines B–C, C–D, and D–A of FIG. 1 of the accompanying drawing.
20. The fiber of claim 19 wherein the equivalent amount of silica is 20 to 50 weight percent.
21. A method of forming transparent refractory articles, comprising shaping and evaporatively gelling a viscous aqueous mixture of an organic aluminum compound and a boron compound in which the relative alumina and boria mol ratios are 9:2 to 3:1.5, and firing the resulting shaped green article at a temperature up to about 1000–1200° C. to remove water and organic material from said green article and convert it into a transparent refractory article while retaining the shape of said green article.
22. The method according to claim 1 wherein said mixture is in the form of an aqueous solution of said compounds.
23. The method according to claim 21 wherein said mixture is in the form of an aqueous dispersion containing colloidal silica amounting up to 65 weight percent of said refractory.
24. A method for forming refractory fibers which comprises extruding through orifices a viscous aqueous dispersion of a water soluble aluminum compound, a water soluble boron compound, and colloidal silica in which the equivalent alumina, boria and silica contents are within the boundary A, B, C, and D and along the boundary lines B–C, C–D, and D–A of FIG. 1 of the accompanying drawing, drawing the resulting continuous transparent green fibers in air, and firing the green fibers at temperatures up to about 1000–1200° C. to remove water and organic material therefrom and convert the green fibers into continuous transparent refractory fibers comprising aluminum borosilicate crystallites.
25. The method of claim 24, wherein said aqueous dispersion comprises basic aluminum acetate and colloidal silica in which the relative alumina:boria mol ratio 3:1 and the amount of silica is such that the fired fiber contains 20 to 50 weight percent silica.

26. A composition comprising an aqueous mixture of aluminum and boron compounds with equivalent alumina: boria mol ratios of 9:2 to 3:1.5.

27. The composition of claim 26 wherein said mixture is in the form of a dispersion containing colloidal silica, the amounts of equivalent alumina, boria, and silica being within the boundary defined by A, B, C, and D and on the boundary lines B–C, C–D, and D–A of FIG. 1 of the accompanying drawing.

2. The composition of claim 27 wherein said amount of silica is 20 to 50 weight percent.

29. The composition of claim 28 further comprising 0.5 to 25 weight percent of a metal oxide additive based on the total weight of the equivalent oxides in said mixture.

References Cited

UNITED STATES PATENTS

| 2,118,143 | 5/1938 | Benner et al. | 106—67 |
| 3,080,242 | 3/1963 | Berry | 106—65 |
| 3,164,442 | 1/1965 | Bommer | 23—59 |
| 3,350,166 | 10/1967 | Alley et al. | 23—59 |
| 3,503,765 | 3/1970 | Blaze | 106—65 |

JAMES E. POER, Primary Examiner

U.S. Cl. X.R.

423—625

UNITED STATES PATENT OFFICE
CERTIFICATE OF CORRECTION

Patent No. 3,795,524        Dated March 5, 1974

Inventor(s) Harold G. Sowman

It is certified that error appears in the above-identified patent and that said Letters Patent are hereby corrected as shown below:

Column 4, line 70, "9 1" should read -- 9.1 --
Column 5, line 26, "higher" should read -- high --
Column 9, line 30, "$9Al_2O_3:2B_2O_3$" should read
     -- $9Al_2O_3 \cdot 2B_2O_3$ --
Column 11, line 26, "polyester. "Teflon" " should read
     -- polyester, "Teflon" --
Column 13, line 41, "passengare-car" should read
     -- passenger-car --
Column 14, line 34, "X-ray di diffraction" should read
     -- X-ray diffraction --
Column 14, line 55, "No. diffraction " should read -- No
     diffraction --
Column 17, line 37, "$9AlO_3$" should read -- $9Al_2O_3$ ---
Column 24, line 15, "3000 C." should read -- 300° C. -- and
     "fixed" should read -- fired --.
Column 24, line 18, "first" should read -- fired --
Column 26, line 50, "claim 1" should read -- claim 21 --
Column 27, line 10, "2." should read -- 28. --.

Signed and sealed this 5th day of November 1974.

(SEAL)
Attest:

McCOY M. GIBSON JR.        C. MARSHALL DANN
Attesting Officer           Commissioner of Patents